United States Patent
Knoblauch et al.

(10) Patent No.: US 7,334,494 B2
(45) Date of Patent: Feb. 26, 2008

(54) APPARATUS FOR THE ABSORPTION OF ROTATIONAL VIBRATIONS OF AN INTERNAL COMBUSTION ENGINE

(75) Inventors: Richard Knoblauch, Weissach (DE); Christina Exner, Illingen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 599 days.

(21) Appl. No.: 10/779,605

(22) Filed: Feb. 18, 2004

(65) Prior Publication Data

US 2004/0168533 A1 Sep. 2, 2004

(30) Foreign Application Priority Data

Feb. 28, 2003 (DE) ............... 103 08 764

(51) Int. Cl.
*H02K 7/116* (2006.01)
(52) U.S. Cl. .................................. 74/421 A
(58) Field of Classification Search ........ 74/640, 74/412 R, 416, 417, 421 A
See application file for complete search history.

(56) References Cited

U.S. PATENT DOCUMENTS

| | | | |
|---|---|---|---|
| 3,318,168 A | 5/1967 | de Coye de Castelet | |
| 3,321,988 A | 5/1967 | Peras | |
| 4,287,791 A | 9/1981 | Numazawa et al. | |
| 5,033,323 A | 7/1991 | Janson | |
| 5,165,495 A * | 11/1992 | Fujii | 180/444 |
| 5,249,995 A * | 10/1993 | Meisenburg et al. | 440/81 |
| 6,073,506 A | 6/2000 | Wireman | |
| 6,296,096 B1 | 10/2001 | Chludek | |
| 6,308,588 B1 * | 10/2001 | Zubik | 74/417 |

FOREIGN PATENT DOCUMENTS

| | | |
|---|---|---|
| DE | 26 32 087 A1 | 1/1978 |
| DE | 34 18 671 C2 | 5/1985 |
| DE | 37 35 855 A1 | 5/1989 |
| DE | 198 24 457 C2 | 12/1999 |
| FR | 1 388 980 | 2/1965 |
| WO | WO 99/31410 A1 | 6/1999 |

OTHER PUBLICATIONS

European Search Report dated May 4, 2006 including English Translation of relevant portion (Five (5) pages).

* cited by examiner

*Primary Examiner*—Vicky A. Johnson
(74) *Attorney, Agent, or Firm*—Crowell & Moring LLP

(57) ABSTRACT

Apparatus for the absorption of torsional vibrations of an internal combustion engine includes an input shaft between the internal combustion engine and the transmission, and a drive shaft of the transmission, which is operatively associated with said input shaft. Each of the input and drive shafts includes a torsion bar that has a lower torsional spring constant than the rest of the shaft as a whole. The apparatus further includes a rotating mass device on each of the input and drive shafts, and the apparatus is disposed between the internal combustion engine and the transmission.

14 Claims, 2 Drawing Sheets

APPARATUS FOR THE ABSORPTION OF ROTATIONAL VIBRATIONS OF AN INTERNAL COMBUSTION ENGINE

This application claims the priority of German Patent Document No. 103 08 764.8, filed Feb. 28, 2003, the disclosure of which is expressly incorporated by reference herein.

BACKGROUND AND SUMMARY OF THE INVENTION

The invention relates to an apparatus for the absorption of rotational vibrations of an internal combustion engine, especially for a passenger automobile.

A damping apparatus for absorbing or equalizing rotational shocks, especially torque fluctuations in an internal combustion engine, is disclosed in DE 34 18 671 C2. In this damping apparatus two gyrating masses are provided which can rotate to a limited extent together, one being provided on the internal combustion engine and the other on a coupling disk of a friction clutch.

DE 37 35 855 discloses a gear shift for a motor vehicle, which comprises a first shaft and a second shaft for the engagement of gears of the gear shift. Moreover, the gear shift is provided with a third shaft into which a torsional vibration absorber is installed. In order to absorb clashes which are produced by the closing of a separating clutch due to the unsynchronized condition of the rotational speed of an internal combustion engine and the rotational speed of the transmission.

It is an object of the invention to create an apparatus for absorbing rotational vibrations of an internal combustion engine, which can be provided between the internal combustion engine and a transmission in a simple manner and at low manufacturing cost.

According to the invention, this object is achieved by an apparatus that includes an input shaft between the internal combustion engine and a transmission, and a drive shaft of the transmission, which is operatively associated with said input shaft, wherein each of the input and drive shafts includes a torsion bar that has a lower torsional spring constant than the rest of the shaft as a whole, wherein the apparatus further includes a rotating mass device on each of the input and drive shafts, and wherein the apparatus is disposed between the internal combustion engine and the transmission.

One of the advantages mainly achieved by the invention is to be seen in the fact that the apparatus is formed by available components, namely an input shaft and a drive shaft of the transmission, which are made in the form of relatively easily twisting torsion bars and are provided with gyrating mass devices. The gyrating mass devices are toothed wheels which serve to transfer force from the input shaft to the drive shaft, i.e., they are components of the transmission. Due to the design of the torsion bars and gyrating mass devices on the input shaft and drive shaft, the apparatus is able, without additional measures, to compensate rotational vibratory excitations of the internal combustion engine. Thus peak tensions in the components of the transmission are prevented and clashing noises produced by the transmission gears are reduced. Lastly, the driver teeth between the hubs of the bevel gears of the input shaft damp the natural vibrations of the apparatus.

Other objects, advantages and novel features of the present invention will become apparent from the following detailed description of the invention when considered in conjunction with the accompanying drawings.

BRIEF DESCRIPTION OF THE DRAWINGS

An embodiment of the invention is shown in the drawing and is further described below.

DETAILED DESCRIPTION OF THE DRAWINGS

Figure 1:
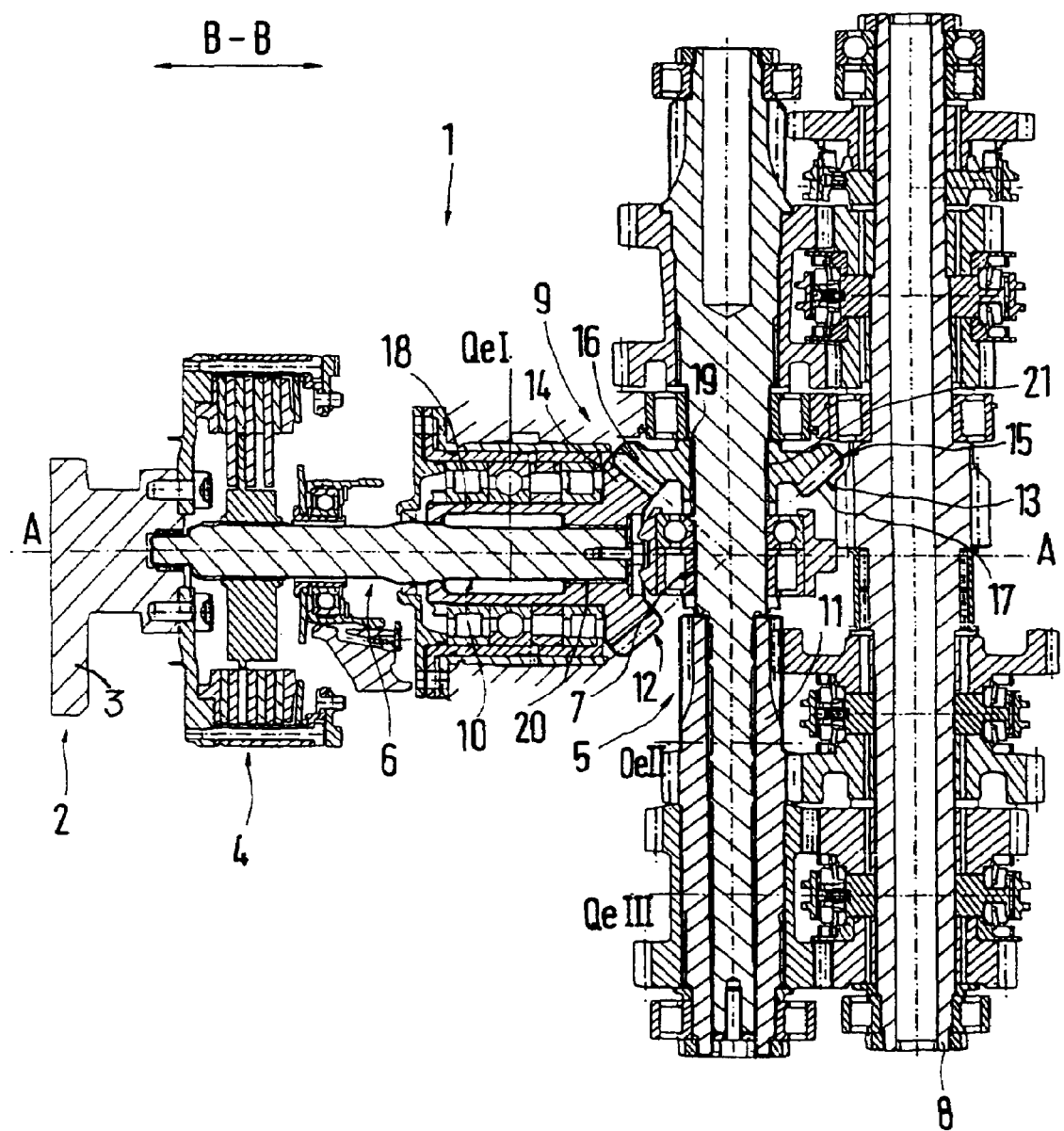
FIG. 1 shows a more or less horizontal section through parts of an internal combustion engine and of a transmission for a passenger car with the apparatus according to the invention, and FIG. 2 an oblique left rear view of parts of FIG. 1.
Figure 2:
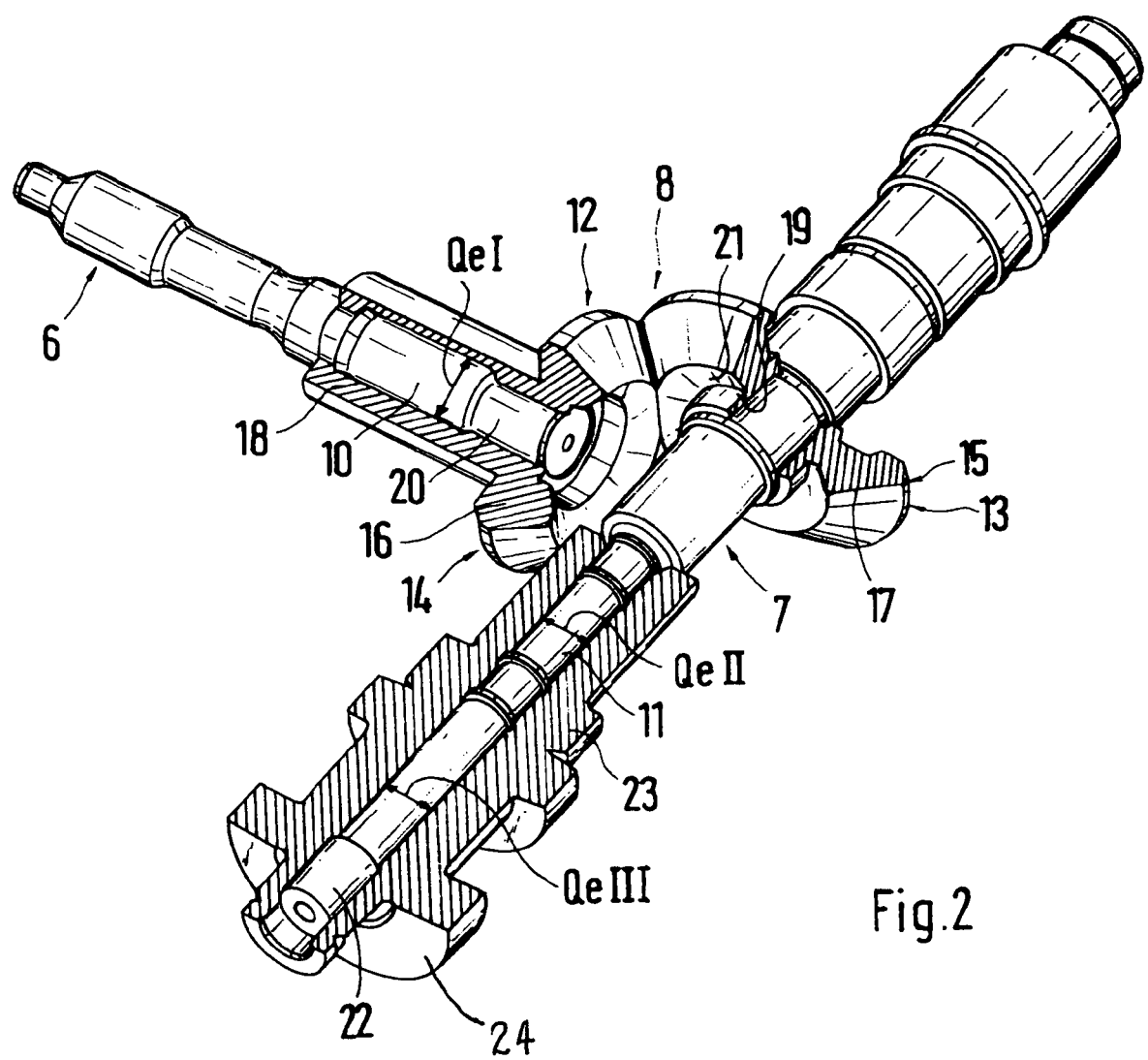

A driving unit 1 (mid-mounted engine) arranged in the rear part of a passenger automobile (not shown) comprises an internal combustion engine 2 with a schematically indicated crankshaft 3 which cooperates with a transmission 5 with the interposition of a clutch 4. With an input shaft 6, the clutch 4 drives a drive shaft 7 of the transmission 5 (gear shift type). The drive shaft 7 and a driven shaft 8 of the transmission run transversely across the longitudinal shaft A-A of the input shaft 6 and crankshaft 3, the longitudinal shaft A-A extending in the lengthwise direction B-B of the passenger automobile. Between the internal combustion engine 2 and crankshaft 3 and the transmission 5 an apparatus 9 is provided to absorb torsional vibrations of the internal combustion engine 2.

The apparatus 9 is formed by designing the input shaft 6 and the drive shaft 7 as relatively easily twisting torsion bars 10 and 11. Furthermore, first and second gyrating mass devices 12 and 13 are provided on the input shaft 6 and the drive shaft 7. The gyrating mass devices 12 and 13 are represented by gears 14 and 15 which operate by transferring torque, i.e., meshing with one another between the input shaft 6 and the drive shaft 7. Due to the arrangement of the input shaft 6 and drive shaft 7, namely at right angles to one another, the gears are made in the form of bevel gears 16 and 17.

The bevel gears 16 and 17 surround the input shaft 6 and drive shaft 7 with their hubs 18 and 19, respectively. Between the hub 18 of the bevel gear 16 and the input shaft 6 a first driver gear 20 is provided. Between the hub 19 and the drive shaft 7 is a second driver gear 21. A third driver gear 22 connects a hub 23 for the fixed gears 24 of speeds of the transmission 5 to the drive shaft 6.

The torsion bars 10 and 11 are formed by one or more cross-sectional constrictions QeI, QeII and QeIII of the input shaft 6 and drive shaft 7. In the embodiment, the constriction QeI is cut into the input shaft 6 near the hub 18 of the bevel gear 16. On the other hand the cross-sectional constrictions QeII and QeII are made between the hub 23 and the drive shaft 6.

The special configuration of the torsion bars 10 and 11, of the gyrating mass devices 12 and 13, and also the driver teeth 20, 21 and 22 which are necessary to the apparatus 9, can be defined empirically, iteratively or mathematically.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Apparatus disposed between an internal combustion engine and a gear shift transmission unit for the absorption of torsional vibrations of the combustion engine, comprising an input shaft and a gear shift transmission unit drive shaft operatively associated transversely to said input shaft, wherein each of the input and drive shafts includes a torsion bar having a lower torsional spring constant than a remainder of the shafts as a whole, and a rotating mass device on each of the input and drive shafts.

2. Apparatus according to claim 1, wherein the rotating mass devices include gears which are in engagement with one another.

3. Apparatus according to claim 2, wherein the gears are bevel gears.

4. Apparatus according to claim 3, wherein the bevel gears include first and second hubs that surround the input shaft and the drive shaft, respectively, and first and second sets of driver teeth are provided between the first and second hubs and the input shaft and the drive shaft, respectively.

5. Apparatus according to claim 4, further comprising a third hub for fixed gears of speeds of the gear shift transmission unit and a third set of driver teeth, the third hub being joined to the drive shaft by the third set of driver teeth.

6. Apparatus according to claim 1, further comprising a third hub for fixed gears of speeds of the transmission unit a third set of driver teeth, the third hub being joined to the drive shaft by the third set of driver teeth.

7. Apparatus according to claim 1, wherein the torsion bars are formed by one or more cross-sectional constrictions of the input shaft or drive shaft.

8. Apparatus according to claim 7, wherein the cross-sectional constrictions are provided in the vicinity of the hubs of the bevel gear of the input shaft and of the fixed gears of the drive shaft.

9. Apparatus disposed between an internal combustion engine and a transmission for absorption of rotational vibrations of the internal combustion engine, comprising:

an input shaft disposed between the internal combustion engine and a gear shift transmission unit;

a gear shift transmission unit drive shaft operatively associated with and arranged transverse to the input shaft, wherein each of the input and drive shafts is a torsion bar of relatively lower torsional spring constant compared to a remainder of the shaft as a whole; and a rotating mass device on each of the input shaft and drive shaft, the rotating mass devices including respective meshing gears.

10. Apparatus according to claim 9, wherein the torsion bars are formed by one or more cross-sectional constrictions of the input shaft or drive shaft.

11. Apparatus according to claim 10, wherein the cross-sectional constrictions are provided in the vicinity of the hubs of the bevel gear of the input shaft and of the fixed gears of the drive shaft.

12. A vehicle, comprising:

an internal combustion engine having a crankshaft;

a gear shift transmission unit, having a drive shaft;

an apparatus having an input shaft connected with the crankshaft via a clutch, and extending transverse to the drive shaft, wherein each of the input and drive shafts include a torsion bar having a lower torsional spring constant than a remainder of the shafts as a whole and a rotating mass on each of the shafts.

13. A vehicle according to claim 12, wherein the torsion bars are formed by one or more cross-sectional constrictions of the input shaft or drive shaft.

14. A vehicle according to claim 13, wherein the cross-sectional constrictions are provided in the vicinity of the hubs of the bevel gear of the input shaft and of the fixed gears of the drive shaft.

* * * * *